United States Patent [19]

Goodrich et al.

[11] Patent Number: 4,880,966
[45] Date of Patent: Nov. 14, 1989

[54] TACHOMETER SENSOR USING A LENS SYSTEM TO A IN SENSING THE ROTATIONAL SPEED OF AN OBJECT

[75] Inventors: Jeffrey A. Goodrich; Charles M. Poe, Jr.; Jeffrey A. Prsha, all of San Diego, Calif.

[73] Assignee: Scientific-Atlanta, Inc., Atlanta, Ga.

[21] Appl. No.: 179,644

[22] Filed: Apr. 8, 1988

[51] Int. Cl.$^4$ .............................................. G01D 5/34
[52] U.S. Cl. ........................ 250/231 R; 250/231 SE; 324/175
[58] Field of Search ........ 250/231 R, 231 SE, 237 G; 324/175; 341/13

[56] References Cited

U.S. PATENT DOCUMENTS

| | | | |
|---|---|---|---|
| 3,007,051 | 10/1961 | Amara et al. | 250/334 |
| 3,508,066 | 4/1970 | Agar | 250/571 |
| 3,622,801 | 11/1971 | Stone | 307/262 |
| 3,654,553 | 4/1972 | Mary et al. | 324/175 |
| 3,681,690 | 8/1972 | Mary | 324/162 |
| 3,688,570 | 9/1972 | Burke, Jr. | 250/231 SE |
| 3,733,892 | 5/1973 | Rennick | 73/659 |
| 3,802,273 | 4/1974 | Helmuth et al. | 73/455 |
| 3,938,762 | 2/1976 | Murphy | 73/462 |
| 3,945,256 | 3/1976 | Wilson et al. | 73/455 |
| 4,053,123 | 10/1977 | Chadwick | 244/17.11 |
| 4,112,774 | 9/1978 | Chadwick | 73/455 |
| 4,158,504 | 6/1979 | de Ponteves et al. | 356/247 |
| 4,184,737 | 1/1980 | Hirschberg | 356/349 |
| 4,387,785 | 6/1983 | Fromm | 324/175 |
| 4,397,520 | 8/1983 | Neil | 350/564 |
| 4,531,408 | 7/1985 | Chadwick et al. | 73/455 |
| 4,576,432 | 3/1986 | Rüger | 350/1.2 |
| 4,634,255 | 1/1987 | Suda et al. | 354/406 |
| 4,655,562 | 4/1987 | Kreitzer et al. | 350/569 |
| 4,665,622 | 5/1987 | Idan | 356/252 |
| 4,774,463 | 9/1988 | Mizobuchi et al. | 250/231 SE |

*Primary Examiner*—David C. Nelms
*Assistant Examiner*—Stephone B. Allen
*Attorney, Agent, or Firm*—Kilpatrick & Cody

[57] ABSTRACT

An optical tachometer sensor for providing output relating to rotational speed of an object. The sensor illuminates a reflective mark on the object with modulated light and focuses that light via a receiving lens arrangement onto a photoelectric sensor which provides signals to conditioning circuitry for controlling output. Lenses in the sensor also form a Galilean telescope or a terrestrial telescope to allow a user to boresight the sensor by viewing the reflective marker through the sensor. A beam splitter or "hot mirror" reverses the optical path of modulated rays generated by the device for focusing on the photoelectric sensor, while allowing visible light to pass and be aligned by a divergent ocular lens. In the terrestrial telescope embodiment, a convergent inverting lens and ocular lens provide the image for the user and the photoelectric sensor may be located at the focal point of the objective lens or the inverting lens.

20 Claims, 10 Drawing Sheets

TACHOMETER SENSOR USING A LENS SYSTEM TO A IN SENSING THE ROTATIONAL SPEED OF AN OBJECT

This invention relates to an optical tachometer sensor which is well suited for sensing rotational velocity of helicopter rotor shafts. The invention may also be used for sensing rotational velocity of other rotating shafts or members.

BACKGROUND OF THE INVENTION

Apparatus for balancing helicopter rotors typically require a "one-per-rev" signal for timing and other purposes. Two methods are currently popular for obtaining such signals. One method is to connect to the tachometer-generator which is mechanically connected to the main rotor. The output of this device is typically two sine waves 90° out of phase with each other. This signal provides angular velocity, phase and directional information for the main rotor. The drawback to using this signal is that it requires tapping into the helicopter's wiring harness and conditioning the signal for the various types of tachometer-generators.

The second method of obtaining a tachometer signal is to mount a coil wrapped around a magnetic core near the main rotor shaft. A ferromagnetic plate is attached to the main rotor shaft and passes in close proximity (approximately ¼ inch) to the coil as the shaft rotates. The reluctance of the air gap between the plate and the coil changes and induces a voltage across the coil when the plate passes. Such devices are known as magnetic interrupters, and brackets to mount them are found on most helicopters. The major disadvantage to using magnetic interrupters is the close mechanical tolerance for alignment of the plate and coil. If they are too distant, the interrupter output is degraded, and if they are too close, they may physically contact one another resulting in mechanical failure and potential harm to the helicopter power train from foreign object damage (FOD). An additional disadvantage to using magnetic interrupters is the weight of the interrupter plate, which can cause significant imbalance in small rotor shafts. For these reasons, magnetic interrupters have begun to be replaced by optical units.

The earliest optical units utilized a beam of visible or infrared light generated by a lamp to illuminate a reflector on the rotor shaft. A receiver detected the reflected beam. The added range provided by the optical unit decreased the need for close mechanical tolerances required by magnetic interrupters. These early optical devices were sensitive to the shadows of the helicopter blades, changes in ambient light, strobe light interference and several other sources of optical noise, however. To solve this problem, most optical units now modulate the emitted beam and trigger only when they detect a beam with the correct carrier frequency. As a result of the necessity to modulate the beam and the modulation frequencies required, virtually all optical units now use a light emitting diode (LED), an infrared emitting diode (IRED), or a laser diode to generate light. Because the highest power output diode devices emit in the infrared region, and because silicon detectors frequently enjoy highest sensitivity in the infrared region, virtually all devices on the market for helicopter optical tachometer sensors utilize an infrared beam.

Infrared beams are invisible to the human eye. Infrared optical sensors for helicopters are thus difficult to align. Devices which emit visible light are also difficult to align during the daytime because high ambient light often washes out beam strength so the user cannot tell where the beam hits the helicopter rotor shaft. There is thus a need for a device which can be boresighted by the user despite the fact that it uses invisible light, or, if it uses visible light, can be boresighted during daytime.

Another drawback to current optical devices is dictated by their predecessors, the magnetic interrupters. Since so many helicopters are already outfitted with mounting brackets for the magnetic interrupters, there is very strong motivation to make an optical unit compatible with the magnetic interrupter footprint. The magnetic units were very small, however, leaving very little room for the added electronics required by the optical unit. As a result, many (if not all) manufacturers have an optical sensing head which approximates the size of the magnetic interrupter unit, and a signal conditioning unit which typically must be mounted within close proximity (less than five feet) to the optical sensing head. This additional unit must be secured to the exterior of the aircraft and withstand abuse caused by weather, airspeeds approaching 200 miles per hour and other environmental conditions resulting from the external location.

SUMMARY OF THE INVENTION

The optical tachometer sensor of the present invention provides signal outputs compatible with those of earlier magnetic interrupters, including a transformer coupled output which is compatible with the magnetic interrupter (most units specify a TTL compatible output). The device utilizes two coaxial ray paths; the first ray path focuses modulated light onto a photosensor means, and the second ray path is focused by a Galilean telescope or a terrestrial telescope lens arrangement so the user can see the reflective mark on the rotor shaft through the tachometer sensor just as the photoelectric sensor and the light emitting device see that mark.

The device is small enough to fit locations for sensing heads of earlier magnetic interrupters, yet all circuits are contained in a single housing. Because the operating range of the device is up to approximately three feet from the helicopter rotor shaft, the alignment features of the device allow it to be extremely useful particularly at ranges from between one foot and three feet from the helicopter rotor shaft.

It is therefore an object of the present invention to provide an optical tachometer sensor which uses modulated light to drive a photoelectric sensor and which contain lenses that superimpose a visible light path upon the path of modulated light so that the user can view the helicopter rotor shaft through the tachometer sensor in order to align the sensor.

It is an additional object of the present invention to provide a small, rugged, lightweight, easily alignable optical tachometer sensor which may (but need not) be mounted at ranges exceeding one foot from the rotating object whose rotation is being sensed.

It is an additional object of the present invention to provide an optical tachometer sensor which contains lenses that form a Galilean telescope or a terrestrial telescope so the user can view through the sensor the object whose rotation is being sensed, and which features a light emitting device and photoelectric sensor coaxial to the axis of the telescope for providing output signals.

Other objects, features and advantages of the present invention will become apparent with reference to the remainder of this document.

DETAILED DESCRIPTION OF THE DRAWINGS

Figure 1:
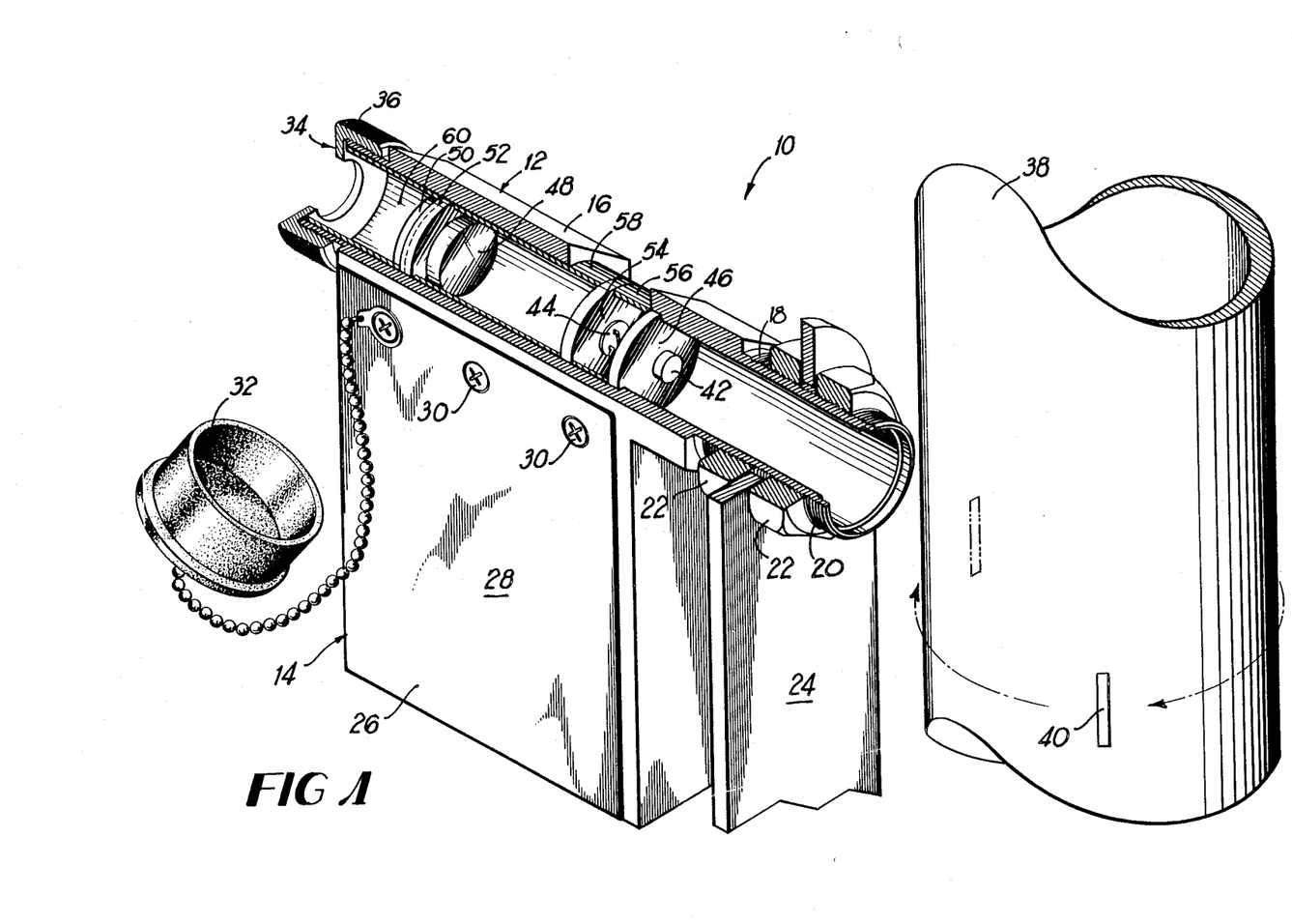
FIG. 1 is a perspective partial cross-sectional view of a first embodiment of a sensor according to the present invention aimed at a helicopter rotor shaft.

FIG. 1 shows a first embodiment of a sensor 10 according to present invention. Sensor 10 generally comprises a tubular optical unit 12 and transceiver circuit unit 14 physically attached to optical unit 12. Housing 16 may contain exterior threads 18 on its forward end 20 (facing the rotor shaft) for mounting purposes. As shown in FIG. 1, two nuts 22 can be countertorqued on threads 18 to capture a mounting bracket 24 such as is typically provided on a helicopter airframe. Optical unit housing 16 and portions of the transceiver circuit housing 26 may be cast, molded, machined or otherwise formed as a unit for additional durability. They may be formed of any suitable metal or plastic material, but are preferably formed of stainless steel because of its strength, durability, resistance to corrosion and electrical shielding properties. Transceiver circuit housing 26 is closed by a cover 28 which may be fastened to housing 26 by screws 30 as shown in FIG. 1. A cap 32 may be physically attached to housing 26 or 16 for covering the rear end 34 and eye piece 36 of optical unit 12.

As shown in FIG. 1, optical unit 12 is aimed at helicopter rotor shaft 38 so that it illuminates at least one reflective mark 40 on the shaft. Optical unit 12 illuminates mark 40 with a light emitting device which may transmit visible, infrared, laser or other types of light. Light emitting device 42 is preferably an infrared emitting diode whose output can be modulated. Light emitting device 42 provides rays which are reflected from mark 40 on shaft 38 back into optical unit 12 for focusing by an arrangement of lenses onto a photoelectric sensor 44 which is preferably a phototransistor.

Figure 2:
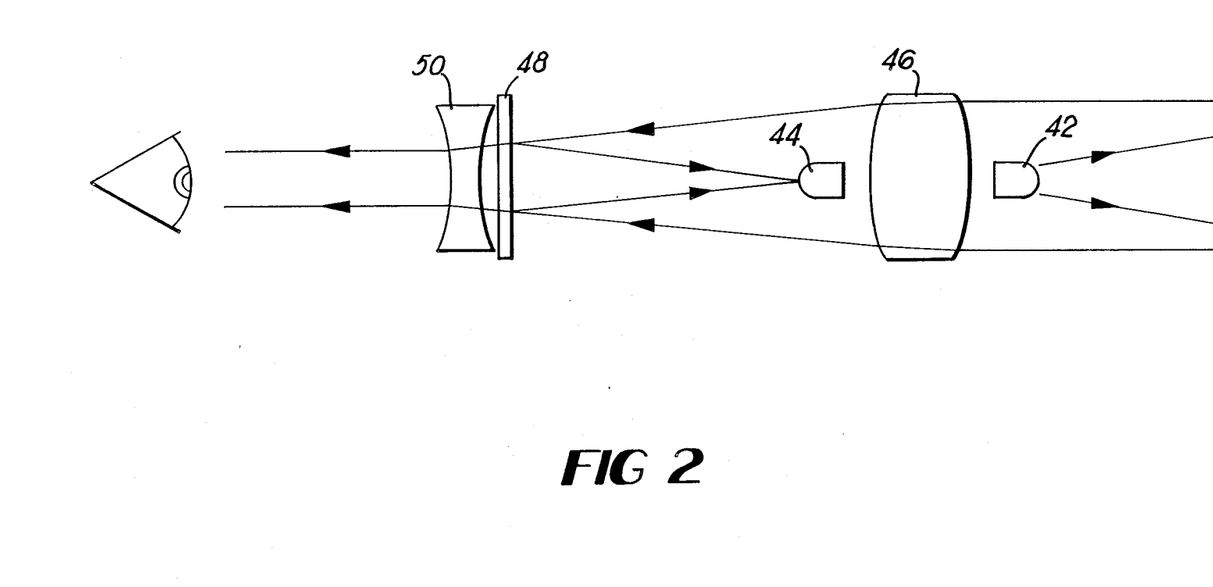
FIG. 2 is a schematic view of the lens arrangement of the sensor of FIG. 1, which utilizes a Galilean telescope arrangement for visible light rays and a beam splitter means for focusing modulated light onto the photoelectric sensor.
Figure 3:
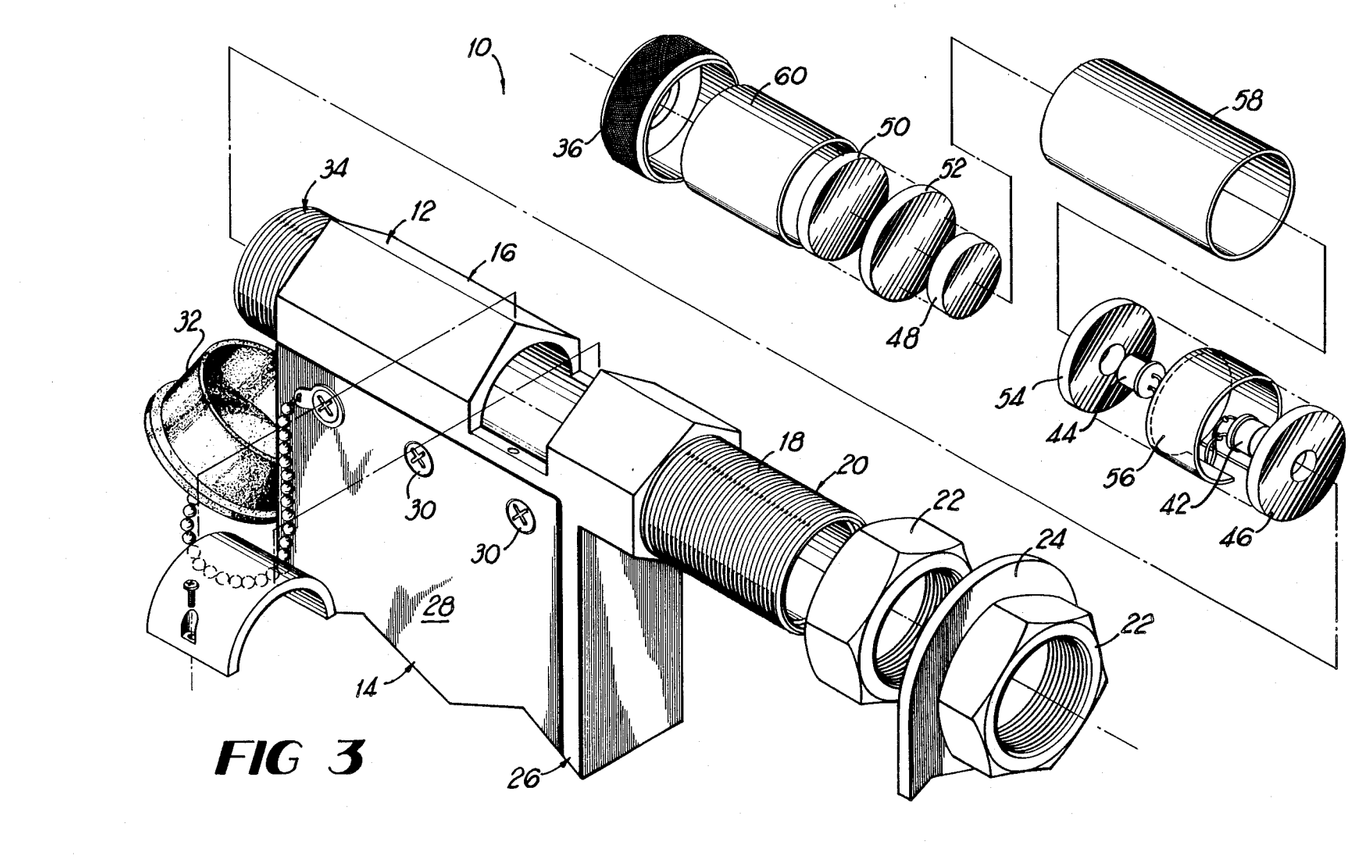
FIG. 3 is a partially exploded view of the sensor of FIG. 1.

As shown in FIGS. 1, 2 and 3, the lens arrangement for the light generated by light emitting device 42 comprises an objective lens 46 and a beam splitting means 48 which reflects and thus reverses the ray path of light refracted by objective lens 46. The light reflected by beam splitting device 48 is focused onto the photoelectric sensor 44 which is located at the focal point of objective lens as reflected by beam splitting device 48. This arrangement thus produces a compact optical unit 12.

Optical unit 12 not only focuses light generated by light emitting device 42 for processing by photoelectric sensor 44, however; it also allows visible light rays from mark 40, which may be generated by ambient light, a flashlight, or other appropriate means, to be viewed through a Galilean telescope arrangement by the human eye so that the user sees mark 40 in order to boresight sensor 10. The Galilean telescope is formed by an ocular lens 50 located toward rear end 34 of optical unit 12 from beam splitting device 48. Ocular lens 50 in this arrangement is a divergent lens and objective lens 46 is a convergent lens.

Beam splitting device 48 is preferably a piece of pyrex glass with a series of dielectric coatings on it which reflect near-infrared and transit visible light. Such a device is commonly known as a "hot mirror." Beam splitting device 48 may be physically attached to ocular lens 50 with a transparent spacer 52. Photoelectric sensor 44 may be mounted in a transparent mounting disk 54 which is connected to objective lens 46 by a tubular spacer 56. Spacers 58 and 60 also help hold the optical components in place inside optical unit housing 16. Eye piece 36 screws onto the rear end 34 of optical unit housing 16 to hold the spacers and lenses in place.

Figure 4:
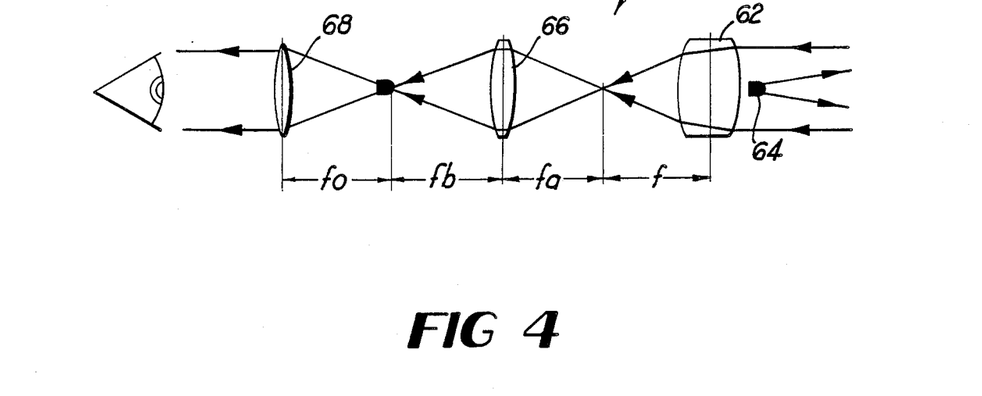
FIG. 4 is a schematic view of a second lens arrangement according to the present invention which forms a terrestrial telescope for visible rays and uses an inverting lens to focus modulated light onto the photoelectric sensor.

FIG. 4 schematically shows a second embodiment of an optical unit 12 according to the present invention. This unit utilizes a terrestrial telescope for focusing visible light rays for the user. An objective lens 62 with a focal length focuses rays emitted by light emitting device 64. An inverting lens 66 has a first focal length $f_a$ and a second focal length $f_b$, and is located a distance $f + f_a$ from objective lens 62. A third ocular lens 68 with focal length $f_o$ is located a distance $f_o + f_b$ from the inverting lens 66. Inverting lens 66 focuses light onto photoelectric sensor 70 located $f_b$ away from inverting lens 66. Inverting lens 66 also inverts visible rays and ocular lens 68 aligns them so that the user can easily boresight the sensor 10.

Inverting lens 66 could easily be eliminated to form a lo Keplerian telescope, but the inverted image of mark 40 would increase difficulty of aligning optical unit 12. Similarly, photoelectric sensor 44 could be placed at the focal point of objective lens 62 rather than at the focal point of inverting lens 66.

The terrestrial telescope arrangement of FIG. 4 allows a reticle to be placed around photoelectric sensor 44 if desired for easy alignment, and it creates a larger exit pupil. The reticle provides an obvious indication of exactly where the device is pointed.

The disadvantages of the terrestrial telescope arrangement are that at night a flashlight beam cannot be sent through the device "backwards" as an alignment aid as readily, and the optical unit 12 must be increased in length. The filtering effect of the beam splitting device 48, which only reflects near-infrared light to the photoelectric sensor 44, is also lost in the terrestrial telescope arrangement.

Figure 5:
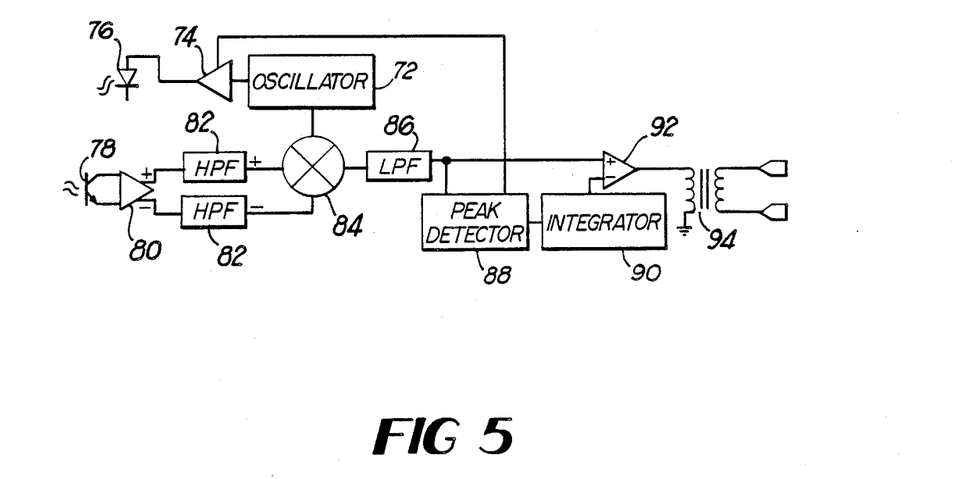
FIG. 5 is a schematic view of transceiver circuits according to the present invention.

FIG. 5 is a block diagram of transceiver circuits of the present invention. A 33 KHz oscillator controls the driver 74 for the infrared emitting diode 76 which generates modulated infrared light. Light reflected from mark 40 drives phototransistor 78 which connects to a differential amplifier 80. Two high pass filters 82 AC couple the output of the differential amplifier 80 and strip off DC components in addition to reducing the sensitivity of the device to reflections modulated at frequencies below the 33 KHz carrier. The output of the high pass filters 82 feed a synchronous demodulator 84 which also receives its drive from the 33 KHz oscillator 72. Signals correlating with the oscillator yield a net DC offset while signals not correlating with the oscillator yield an AC output. The low pass filters 86 at the output of the demodulator 84 then block the non-correlating signals. This results in a very high rejection of spurious light perceived by the phototransistor 78 which was not emitted by the infrared emitting diode 76. A peak detector 88 connected to low pass filters 86 stores the strongest signal in an integrator 90 with a multisecond time constant. The incoming signal from low pass filters 86 is compared in comparator 92 to the values stored in integrator 90 and this forms a threshold detection circuit. Comparator 92 then drives a transformer 94 which provides DC isolation of the output and simulates magnetic interrupter output. The circuit can thus drive systems which were designed for a magnetic pickup. Additionally, the output signal is strong enough to drive TTL input assuming that input has been protected by an undershoot diode. Due to the relatively high gain of the filters, signals which have a very strong reflection tend to overdrive the comparator 92 circuit. To circumvent this problem, the returned signal strength stored in the peak detector 88 is fed back to driver 74 to reduce the output power, resulting in an automatic gain control function.

Power distribution is complicated by the high input voltage requirement. At the current levels required by the infrared emitting diode (about 250 mA), the driver circuit alone would dissipate 7 W. It is difficult to find surface mount transistors which will dissipate 1 W. The power distribution scheme of the present invention derives all of the required supply voltages and still distributes power dissipation. The receiver and infrared emitting diode driver circuits both consist of differential amplifiers which use constant current sources as the common emitter loads. This makes the whole device appear to consume a constant current. There are two principal advantages to this technique. First, most of the noise associated with turning the infrared emitting diode on and off at 33 KHz is eliminated by the complimentary leg of the differential amplifier. Second, in reducing from one voltage (such as 28 VDC to 24 VDC) to another all that is required is a resistor. The receiver appears to be a 6.5 mA load at 24 VDC regardless of the return signal strength. The driver appears to be a 100–250 mA load depending on the returned signal strength. The power dissipated in the driver is limited by the voltage across the driver circuit. Because the driver current source feeds a zener diode (which then regulates the voltage for the filters and comparator) the actual voltage across the driver is only 9–11 VDC. The zener diode, which is not a surface mount component, is then dissipating most of the remaining power. The 12 VDC derived from the zener diode is then split in two to provide a DC "ground" reference for the filters. AC ground is coupled to the zero VDC rail to reduce currents in the DC ground.

Figure 6A:
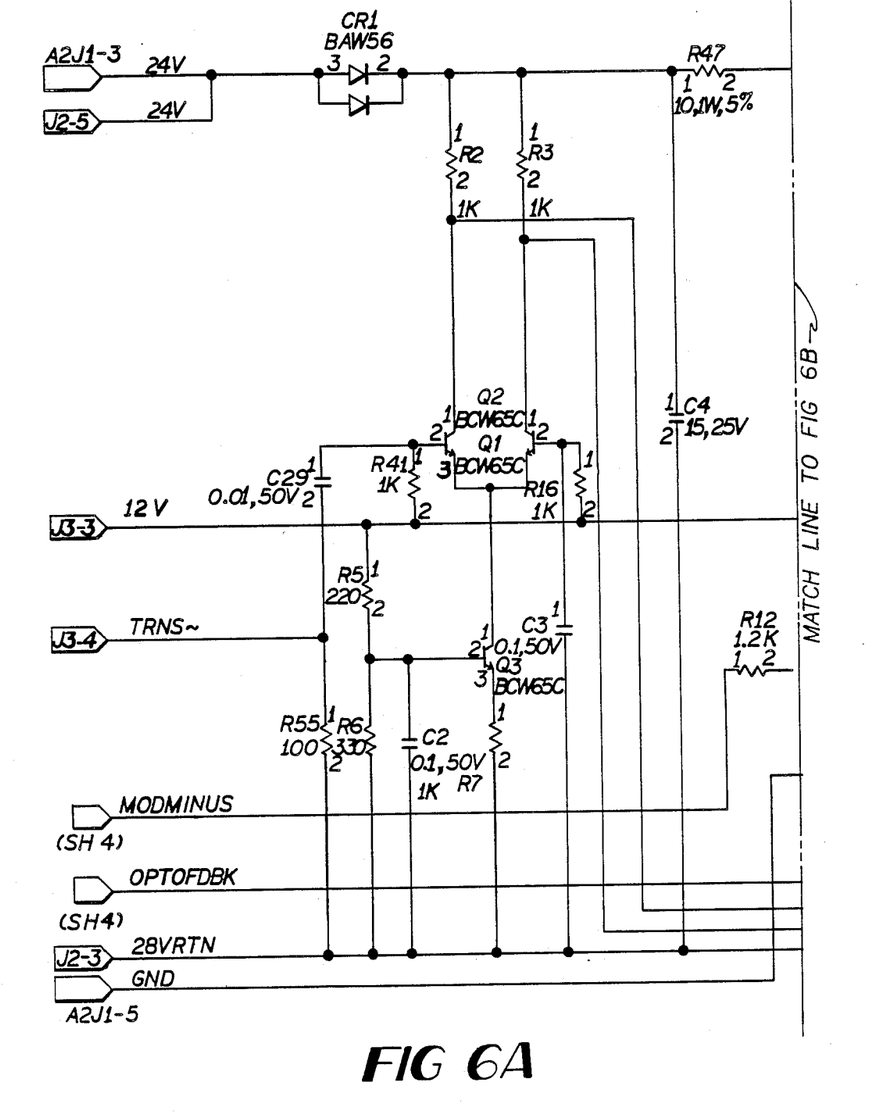
FIGS. 6A and 6B show differential amplifier receiver circuitry and driver circuitry for the device of FIG. 1.
Figure 6B:
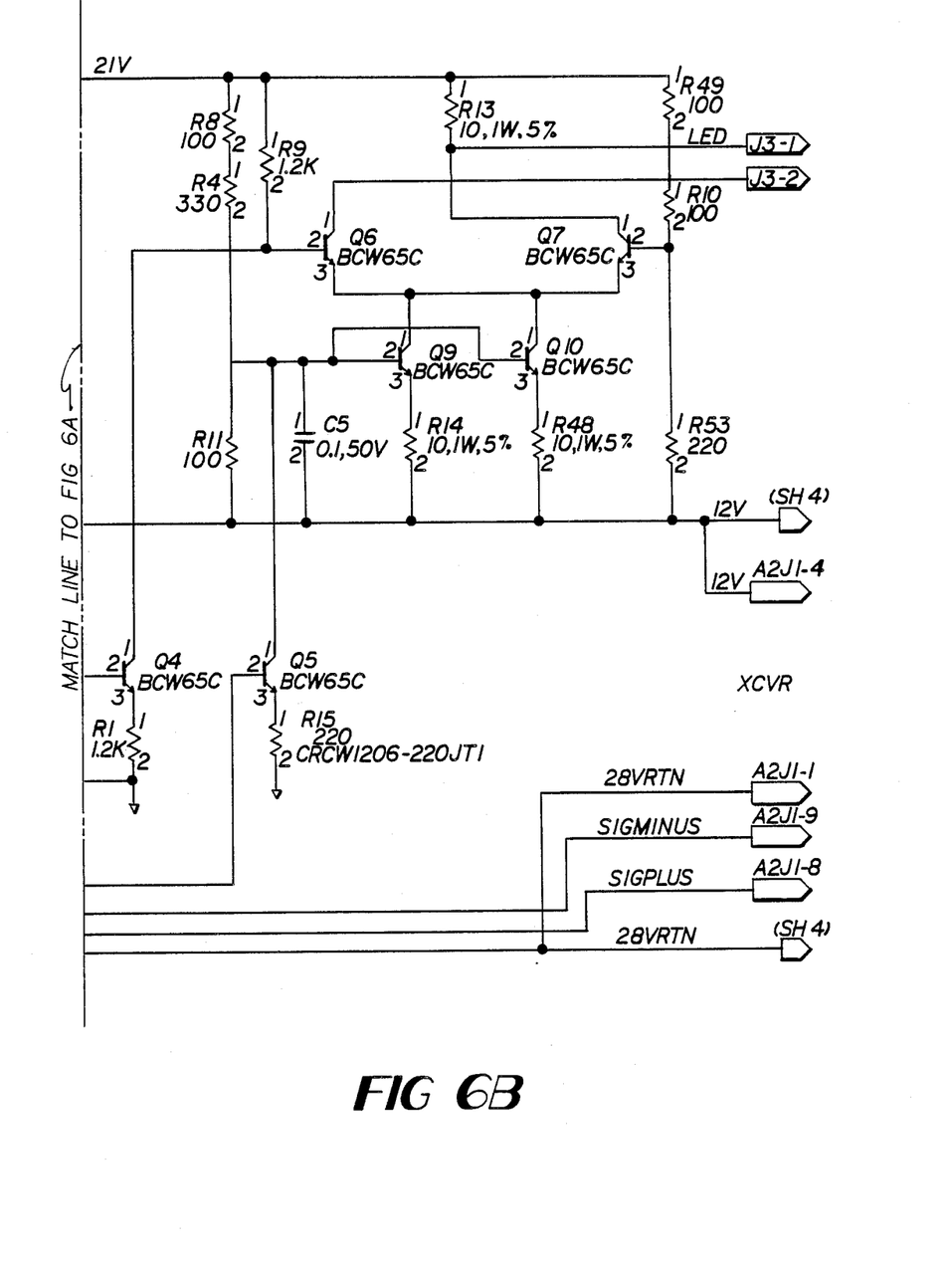

The receiver circuit is shown in FIGS. 6A and 6B. Phototransistor 78 (not shown) is emitter coupled to Q1. Q1 forms one leg of a differential amplifier while Q2 forms the complimentary leg. Q3 is the constant current bias. The output of the receiver is pulled off R2 and R3 as SIGMINUS and SIGPLUS, respectively. The receiver as indicated previously operates directly off of 24 VDC. The bias of Q1 and Q is maintained at 12 volts by the zener regulating diode VRI shown in FIG. 7A.

The infrared emitting diode driver shown in FIG. 6B operates between the 21 V rail and the 12 V rail. The voltage reduction across R13 is dependent on the current strength through Q9 and Q10. The infrared emitting diode, which is not shown, is driven with a square wave by Q6. Q7 balances the current through the circuit during the period of time Q6 is off. The base drive for Q6 is supplied by MODPLUS, one of two complimentary outputs of the oscillator shown in FIG. 8A. The current through Q9 and Q10 is controlled by the voltage at their bases. Normally this voltage is supplied by R4, R8 and R12. However, when the voltage in the peak detector is too high, the OPTOFDBK signal begins to climb off of DC ground, turning on Q5. As the drive to Q5 increases the drive to Q9 and Q10 decreases until equilibrium is reached.

Figure 7A:
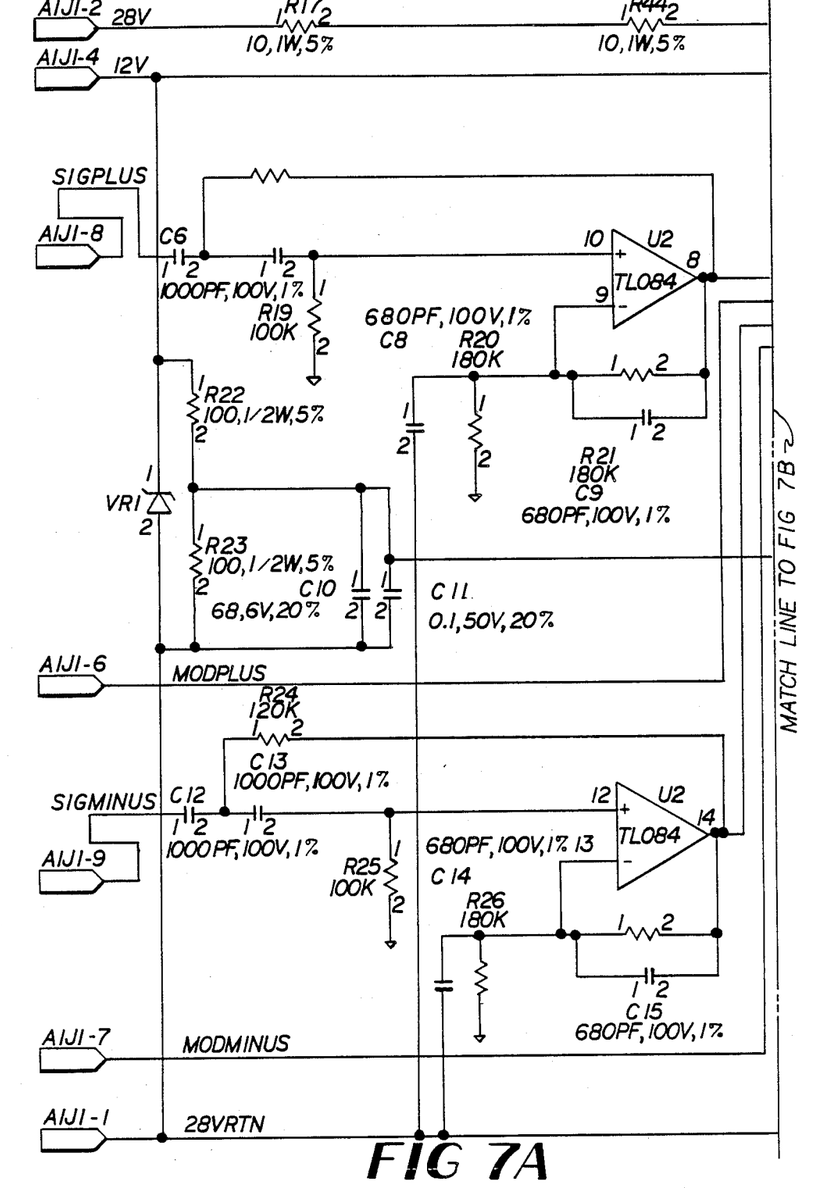
FIGS. 7A and 7B show filter and demodulator circuits for the device of FIG. 1.
Figure 7B:
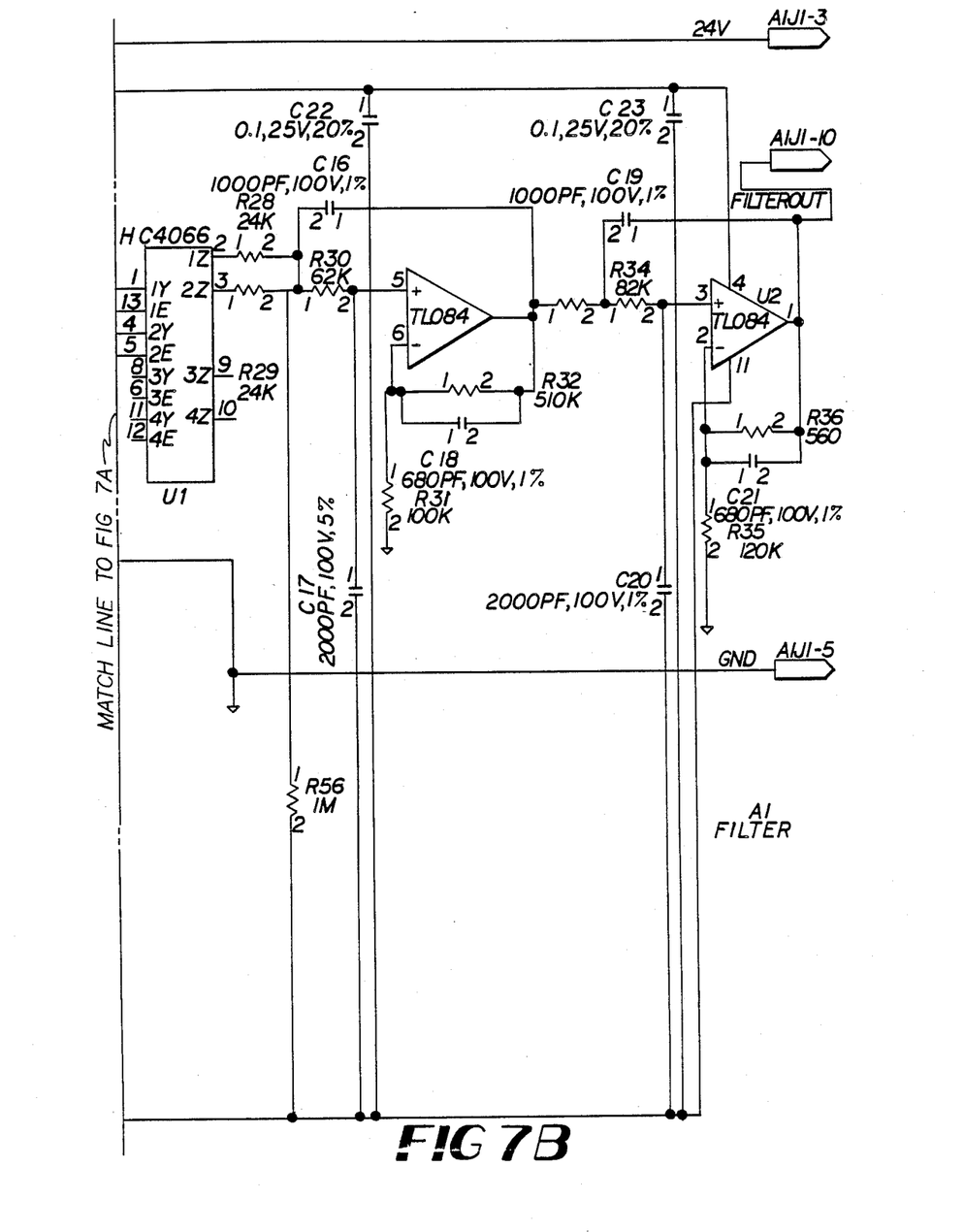

FIGS. 7A and 7B show filter circuits according to the present invention. R17 and R44 drop the input voltage by 4 V in the event that 28 V aircraft power is used instead of power from a 24 V source. VR1 regulates the 12 V power used throughout the circuit. Power dissipation of VR1 is quite high (3–4 W), necessitating its placement on a board which consumes the least power. The 6 V or DC ground is split off CR1 by R22 and R23 and decoupled to AC ground by C10 and C11. The two high pass filters shown in FIG. 7A operate on SIGPLUS and SIGMINUS. These are second order Butterworth filters with a cutoff frequency of about 1200 Hz and a gain of two. The cutoff frequencies are low enough compared to the modulation rate to preserve the shape of the square waves on the inputs.

The synchronous demodulator U1 shown on FIG. 7B is essentially an analog switch which is driven by the oscillator. Assuming a pseudo-square wave input, SIGMINUS will be low during the portion of the cycle where SIGPLUS is high. Additionally, MODPLUS is high and MODMINUS is low while SIGPLUS is high. Thus, while SIGPLUS is high, MODPLUS will enable it through U1 and while SIGMINUS is high, MODMINUS will enable it through U1. The two outputs of U1 are mixed by R28 and R29. Thus signals generated in sync with the oscillator (as in reflections from the infrared emitting diode) will be DC restored and all other signals will be mixed with 30 KHz. FIG. 7B also shows the low pass filters which are fourth order Butterworth filters with a 3000 Hz cutoff frequency and a gain of 36. The output of demodulator U1 is fed into the filters which reject any inputs above the frequency of interest. The cutoff frequency is set high enough to allow operation of the tachometer on inputs above 100,000 RPM.

Figure 8A:
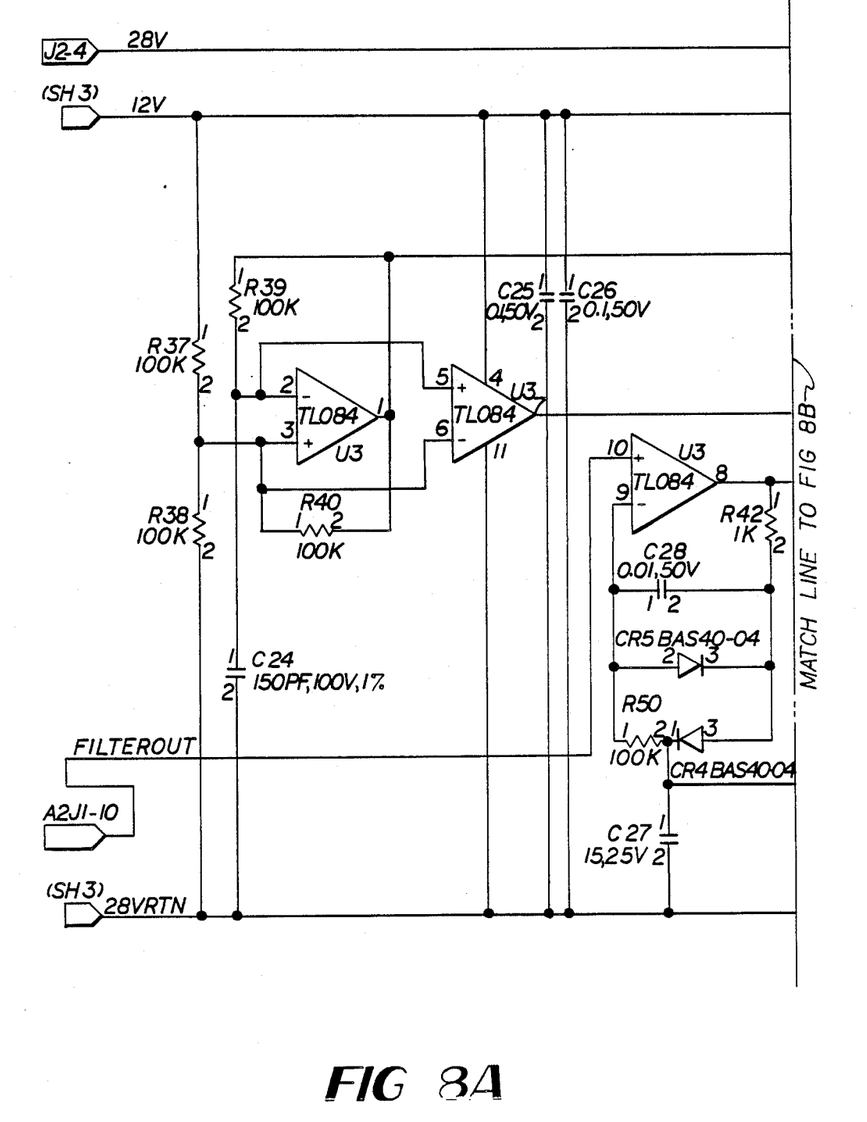
FIGS. 8A and 8B show oscillator, peak detector and output receiver circuits for the device of FIG. 1.

FIG. 8A shows the oscillator circuit which comprises two operational amplifiers. One of the operational amplifiers is driven into oscillation by positive feedback and the other attempts to derive the compliment of the first with minimum phase lag. The outputs of the oscillator are MODPLUS and MODMINUS.

Figure 8B:
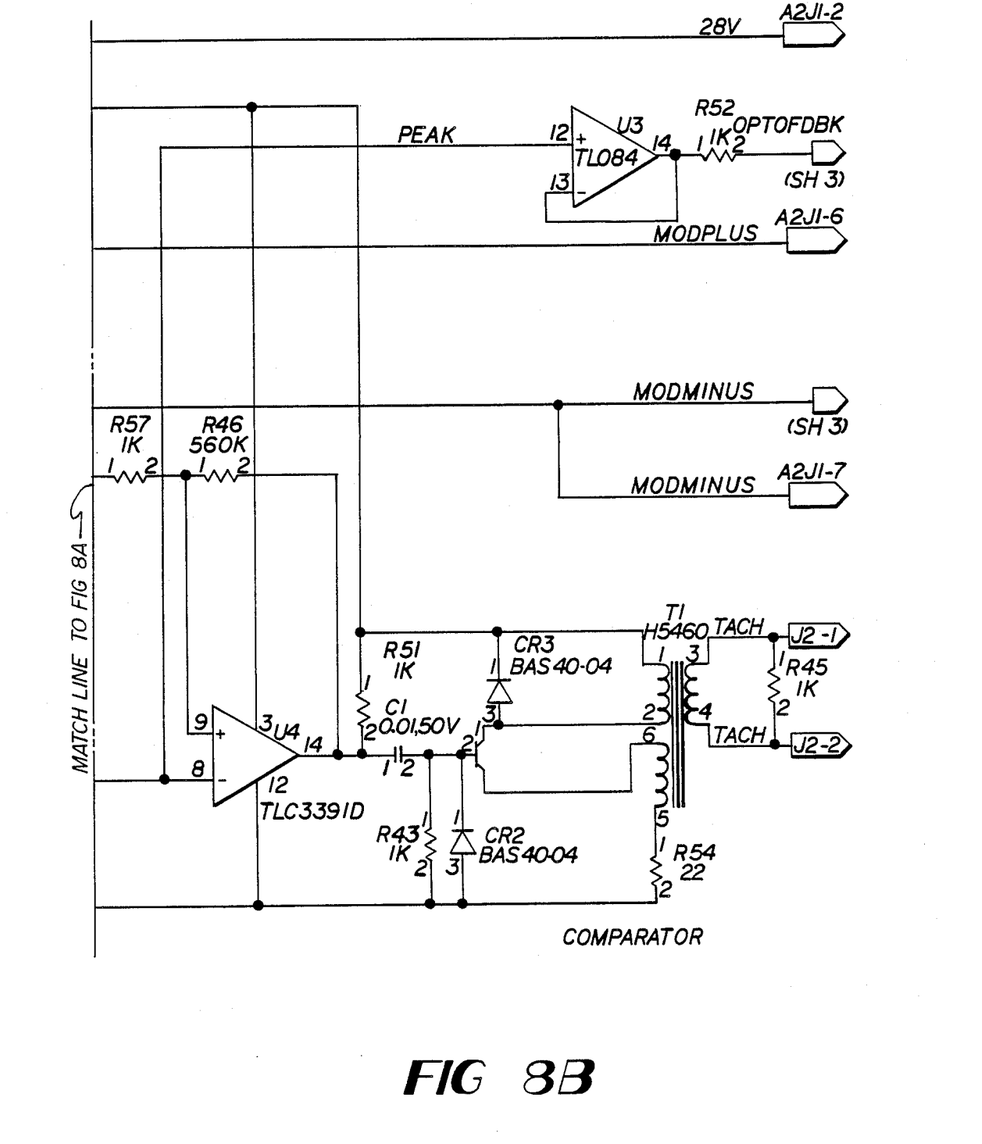

FIGS. 8A and 8B show the peak detector 88 formed by an operational amplifier U3 and two diodes CR4 and CR5. Diodes CR4 and CR5 are the same package and share a common anode. The output of CR5 drives capacitor C27 which decays due to the combined losses of C27, CR5, U4 pin 8 and U3 pin 10. U4 compares the decayed value of C27 to the current value of FILTEROUT and drives Q8 into conduction when FILTER- OUT is greater. The resulting current in T1 generates a pulse on the outputs: TACH and TACH*. The output of the peak detector drives U3 pin 10 which repowers the signal to drive OPTOFDBK.

The foregoing is provided for purposes of explanation and illustration of a preferred embodiment of the present invention. Modifications may be made to the disclosed embodiment without departing from the scope or spirit of the invention.

What is claimed is:

1. A tachometer sensor for sensing rotational speed of an object, comprising:
   (a) a light emitting device for illuminating the object;
   (b) at least one reflective mark on the object for reflecting light rays emitted by the light emitting device;
   (c) an objective lens located in the path of the light rays emitted by the light emitting device and reflected by the mark;
   (d) a beam splitter located in the path of light rays reflected by the objective lens and oriented substantially perpendicular to that ray-path, for reflecting a first portion of the rays in a direction substantially opposite and parallel to that in which the first portion of rays strikes the beam splitter and for allowing a second portion of the rays to pass through;
   (e) a photoelectric sensor located at substantially the focal point of the first portion of the light rays reflected by the objective lens and reflected by the beam splitting means;
   (f) an ocular lens located in the path of the second portion of light rays reflected by the objective lens and penetrating the beam splitting means, for aligning the second portion of rays so that one using the sensor can view the mark on the rotating object through the sensor in order to align the sensor;
   (g) driver means for supplying power to the light emitting device; and
   (h) circuit means for conditioning and providing for output the signals produced by the photoelectric sensor.

2. A device according to claim 1 in which the beam splitting device is a hot mirror.

3. A device according to claim 1 in which the light emitting device is an infrared emitting diode which emits the first portion of light rays.

4. A device according to claim 1 in which the photoelectric sensor is a phototransistor.

5. A device according to claim 1 in which the circuit means contains a peak detector for providing feedback signals to control output of the driver means.

6. A device according to claim 1 in which the light emitting device, objective lens, beam splitting means, photoelectric sensor and ocular lens are located coaxially to one another.

7. A device according to claim 1 which the driver means modulates power to the light emitting device.

8. A device according to claim 2 in which the objective lens is a convergent lens whose focal length substantially equals the distance from the objective lens to the beam splitting device plus the distance from the beam splitting device to the photoelectric sensor.

9. A device according to claim 3 in which the ocular lens is a divergent lens.

10. A device according to claim 8 in which the circuit means contains filters for reducing sensitivity of the tachometer sensor to reflections from the mark modulated at frequencies below that of the signal provided by the driver means.

11. A device according to claim 8 in which an oscillator circuit modulates the driver means and feeds a synchronous demodulator in the circuit means, which synchronous demodulator rejects signals from the photoelectric sensor corresponding to light received by the photoelectric sensor not emitted by the light emitting device.

12. A tachometer sensor for sensing rotational speed of an object, comprising:
   (a) a light emitting device for illuminating the object;
   (b) at least one reflective mark on the object for reflecting light rays emitted by the light emitting device;
   (c) an objective lens located in the path of the light rays emitted by the light emitting device and reflected by the mark, which objective lens has a focal length f;
   (d) an inverting lens having a first focal length $f_a$ and a second focal length $f_b$, located at a distance substantially $f_a+f$ from the objective lens for inverting and refocusing light rays focused by the objective lens;
   (e) a photoelectric sensor located substantially at the focal point $f_b$ from the inverting lens;
   (f) an ocular lens having a focal length $f_o$ located at a distance substantially $f_b+f_o$ from the inverting lens for aligning rays focused by the inverting lens so that one using the sensor can view the mark on the rotating object through the sensor in order to align the sensor;
   (g) driver means for supplying power to the light emitting device; and
   (h) circuit means for conditioning and providing for output the signal produced by the photoelectric sensor.

13. A device according to claim 12 in which the light emitting device, objective lens, inverting lens, photoelectric sensor and ocular lens are located coaxially to one another.

14. A device according to claim 12 in which the objective lens, inverting lens and ocular lens are convergent lenses and form a terrestrial telescope.

15. A device according to claim 12 in which the light emitting device is an infrared emitting diode.

16. A device according to claim 12 in which the photoelectric sensor is a phototransistor.

17. A device according to claim 12 in which the circuit means contains a peak detector for providing feedback signals to control output of the power supply means.

18. A device according to claim 12 in which the driver means modulates power to the light emitting device.

19. A device according to claim 18 in which the circuit means contains filters for reducing sensitivity of the tachometer sensor to reflections from the mark modulated at frequencies below that of the signal provided by the driver means.

20. A device according to claim 18 in which an oscillator circuit modulates the driver means and feeds a synchronous demodulator in the circuit means, which synchronous demodulator rejects signals from the photoelectric sensor corresponding to light received by the photoelectric sensor not emitted by the light emitting device.

* * * * *